United States Patent Office 2,890,224
Patented June 9, 1959

2,890,224
PREPARATION OF VINYL SULFIDES

Henry J. Schneider, Hatboro, Pa., assignor to Rohm & Haas Company, Philadelphia, Pa., a corporation of Delaware No Drawing. Application July 15, 1955
Serial No. 522,401

10 Claims. (Cl. 260—329)

The invention deals with a method for preparing vinyl sulfides. It concerns a process wherein isothiuronium salts are reacted with acetylene in the presence of a strong base catalyst in an aqueous medium.

It has been proposed to make vinyl alkyl sulfides by the addition of acetylene to alkanethiols in the presence of alkali metal bases or salts of cadmium and zinc. Vinyl phenyl thioethers or sulfides have been similarly prepared. There arise, however, several difficulties here. The method is not directly applicable to a wide variety of thiols or is applicable only with troublesome modifications in procedure. Then yields of vinyl thioethers may be mediocre to poor, by the processes of the art, because a molecule of a thiol tends to add across the double bond of the vinyl thioether with formation of compounds having two sulfide linkages. In fact there are some vinyl sulfides which have been made by the process of this invention which cannot be practically produced by the conventional process described above. Another limitation in the prior art process is that many mercaptans, particularly N-alkylaminoalkyl mercaptans, are not available or not easily made. Yet by the process of this invention N-alkylaminoalkyl vinyl thioethers can be made.

I have discovered that when an isothiuronium salt is treated with acetylene in the presence of strong base there is formed a vinyl sulfide or thioether. Inasmuch as the isothiuronium salts are readily formed by bringing together an organic halide and thiourea, this method utilizes relatively readily available raw materials and avoids the necessity of forming and separating mercaptans which were hitherto essential for the preparation and isolation of vinyl thioethers.

The reaction of alkyl halides or alkyl sulfates with thiourea is known. The reaction is quite general and is reported to occur with primary, secondary, and tertiary alkyl, alkenyl, and aralkyl halides. Bromides react more readily than chlorides and primary and secondary groups react better than tertiary. For present purposes the tertiary groups are of little practical value.

Instead of the above halides there may be used halides, the organic residue of which contains groups based on atoms in addition to carbon and hydrogen, e.g., nitrogen, sulfur, or oxygen, these groups being stable to alkali or strong acids. Thus there may be used dimethylaminoethyl chloride or bromide, N-methylaminopropyl bromide or chloride, aminobutyl bromide, or other aminoalkyl halide. Likewise there may be present an ether-containing group, such as an alkoxyalkyl, benzoxyalkyl, or phenoxyalkyl group, typical of which are methoxyethyl chloride, butoxyethyl chloride, butoxyethoxyethyl chloride, benzoxyethyl bromide, cyclohexoxyethyl bromide, phenoxyethyl chloride, octylphenoxyethyl bromide, or phenoxypropyl chloride. Also there may be present hydroxyalkyl groups having a chain of more than two carbon atoms between oxygen and halide, as in hydroxybutyl chloride. Other groups with other than just hydrocarbon are found in haloalkanesulfonic acids, halocarboxylic acids, and heterocyclic-substituted alkyl halides.

Usually the most common starting materials (to form the isothiuronium salt) are organic halides, RX, where X is chlorine or bromine or less desirably iodine or sulfate and R is alkyl, cycloalkyl, aralkyl, alkoxyalkyl, cycloalkoxyalkyl, aryloxyalkyl, aralkoxyalkyl, aminoalkyl, aminoaralkyl, or other grouping with substituents not reactive with thiourea other than halide on the one hand and not decomposed by strong base on the other, including heterocyclic alkyl halides. Dihalides, such as alkylene dibromides, can be used, particularly if there are three or more carbon atoms between the halogen atoms, polymer formation being possible with only two such carbon atoms present. Also dihalides may be used with only one carbon atom between halogens, as in methylene dibromide. In these compounds the alkylene group is equivalent to an alkyl group. In place of alkylene dihalides there may be xylylenyl dihalides with like effect.

Not only may the simple alkyl, cycloalkyl, and aralkyl halides, or similar compounds having substituents stable to alkali and acid be reacted to form isothiuronium salts, but there may also be used cyclic compounds, in particular heterocyclic alkyl halides, such as, tetrahydrofurfuryl or thenyl halides, these being of considerable value as providing final products of interest and utility. Other examples of cycle-containing halides having a heterocycle attached to an aliphatic carbon atom include 1-(2-chloroethyl)imidazolidinone and tetrahydropyranylmethyl chloride or 2-methyl-4-chloromethylthiazole (leading to 2-methyl-4-thiazolylmethyl vinyl thioether), etc.

The chosen halide and thiourea are refluxed together in an aqueous or alcoholic solution to form an isothiuronium salt, thus

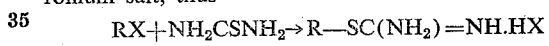

Sometimes this salt can be separated as a crystalline compound; at other times non-crystalline products are obtained. These, nevertheless, have been found to react with acetylene to give desired vinyl thioethers. It is not essential to isolate or separate the salts, as these may be used in alcoholic solution or in aqueous solution. If excess thiourea was used in forming the isothiuronium salt, the excess need not be removed, even though it may react with acetylene.

Experience has shown that isothiuronium salts may be formed with other than thiourea itself. Thus, substituted thioureas have also been found useful for forming isothiuronium salts. For example, N,N-ethylene thiourea is of interest because it and other N,N'-disubstituted as well as mono-N-substituted thioureas, even though not so reactive as thiourea itself, do not permit the side reactions which are sometimes possible with salts from thiourea, such as cyclization.

An isothiuronium salt or a mixture containing it is treated with acetylene at acetylene pressures from atmospheric up to about 700 p.s.i.g. Even higher pressures can be used, with preferred pressures, however, from 300 to 500 p.s.i.g. Temperatures for the reaction with acetylene are usually between 90° and 200° C., preferably between 90° and 140° C., and best usually from 120° to 130° C.

The best catalysts include sodium hydroxide and potassium hydroxide. A strongly basic catalyst is added in an amount at least about equivalent to the isothiuronium salt in the reaction mixture. There should thus be at least one mole of an alkali metal hydroxide per mole of a monoisothiuronium salt or an isothiuronium group. More strong base can be used, if desired, there being no fixed upper limit. It is preferred that there be used from 1.1 to 3 moles of base catalyst per isothiuronium group. Addition of all of the base catalyst may be made at the start of the reaction with acetylene. Or about one mole or perhaps a little more to supply free alkali may be added at the start and more may be supplied as reaction proceeds. The amounts of catalyst are over and above the quantity required to combine with the acid forming a salt of an amine group, as in an aminoalkyl halide hydrohalide.

Excess base and the salt formed in the reaction mixture are taken up in water or in the water layer in the reaction mixture and can thus be separated from the organic materials, including the desired vinyl sulfide product.

Details of preparing typical isothiuronium salts are shown in the following illustrative preparations. Parts are by weight unless otherwise noted.

PREPARATION A (1) Thionyl chloride (290 parts) was placed in an apparatus, which was cooled in a salt-ice bath. Thereto over a period of an hour N-methylethanolamine (177 parts) was added with stirring at a rate to keep the temperature of the reaction mixture below 50° C. Stirring was continued while the temperature of this reaction mixture was allowed to rise to about 25° C., the mixture then being a brown slush. This was boiled with about 800 parts of ethanol for 15 minutes. The hot solution was filtered. The filtrate was chilled by a salt-ice bath. Brown crystals formed and were collected and dried at 50° C. for six hours to provide 248 parts of N-methylaminoethyl chloride hydrochloride, a yield of about 81%.

(2) A solution was prepared from 130 parts of the above salt in 250 parts of water. Thereto was added thiourea in an amount of 83 parts. The resulting mixture was heated under reflux for six hours. There was thus formed a solution of the N-methylaminoethyl isothiuronium chloride hydrochloride, $$HCl \cdot CH_3NHCH_2CH_2S-(NH_2)NH \cdot HCl$$

This solution contained by titration the correct content of ionizable chlorine. It was used for reaction with acetylene.

PREPARATION B (1) To 370 parts of thionyl chloride there was slowly added with stirring 225 parts of 3-aminopropanol. The temperature of the reaction mixture was kept below 50° C. with the aid of external cooling. The mixture was stirred at 25°–30° C. for an hour and poured into 800 parts of ethanol. The resulting mixture was boiled 10 minutes and filtered. The filtrate was subjected to distillation of about 400 parts of ethanol. The residue was chilled with an ice bath to give brown crystals, which were filtered off and dried at 50° C./20 mm. for eight hours. These crystals gave the correct analysis for 3-aminopropyl chloride hydrochloride.

(2) There were mixed 100 parts of thiourea, 170 parts of 3-aminopropyl chloride hydrochloride, and 275 parts of denatured ethanol. This mixture was heated under reflux for four hours. The resulting product was recrystallized from ethanol to give a yield of 85% of the isothiuronium salt, $HCl \cdot NH_2(CH_2)_3S(NH_2)NH \cdot HCl$.

PREPARATION C

There were mixed 320 parts of thiourea, 576 parts of dimethylaminoethyl chloride hydrochloride, and about 400 parts of ethanol. This mixture was heated under reflux for four hours, at which time the entire charge was solid. It was taken up in about 2000 parts of hot ethanol and the resulting solution was chilled to give crystals, which were separated and dried. They amounted to 726 parts. This product contained by analysis 19.1% of nitrogen, 14.3% of sulfur, and 31.9% of chlorine, thus corresponding to S-(N,N-dimethylaminoethyl)-isothiuronium chloride hydrochloride, $$HCl \cdot (CH_3)_2NCH_2CH_2S(NH_2)NH \cdot HCl$$

for the theoretical values are 19.1% N, 14.7% S, and 32.2% Cl.

In the same way there were reacted 2-aminoethyl bromide hydrobromide and thiourea, the product being $HBr \cdot H_2NCH_2CH_2S(NH_2)NH \cdot HBr$. By analysis the product obtained had 14.8% of nitrogen, 11.2% of sulfur, and 56.2% of bromine (theory 15.0%, 11.4%, and 56.9% respectively).

By the same types of procedures other halides may be reacted with thiourea to give corresponding isothiuronium halide hydrohalides. For example, from diethylaminoethyl chloride hydrochloride there is prepared as above the hydrochloride of S-diethylaminoethyl isothiuronium chloride, while the hydrochloride of dimethylaminoisopropyl chloride yields S-dimethylaminoisopropyl isothiuronium chloride hydrochloride. From dimethylaminodecyl chloride hydrochloride there is obtained S-dimethylaminodecyl isothiuronium chloride hydrochloride, etc. Where amino-containing isothiuronium halides hydrohalides are used in the reaction with acetylene, enough alkali is used to supply not only catalyst but also alkali to react with the hydrohalide group.

Illustrative preparations of vinyl sulfides are presented in the following examples where additional details of procedure will be found. Parts as above are by weight unless otherwise designated.

Example 1

A solution of diethylaminoethyl chloride hydrochloride (172 parts) and 83 parts of thiourea in 250 parts of water was refluxed as above to give the desired isothiuronium salt in solution. The main portion thereof (478 parts) was placed in an autoclave and 240 parts of aqueous 50% sodium hydroxide solution was added. The autoclave was flushed three times with nitrogen and three times with acetylene. It was heated to 106° C. Acetylene was passed in at 390 p.s.i.g. Acetylene absorption was rapid accompanied by a rise in temperature of about 14° C. Although the bulk of the absorption occurred in four minutes, the reaction mixture was maintained at 120°–126° C. for an hour with acetylene at 450–500 p.s.i.g. The reaction mixture was then cooled and blown out of the autoclave with nitrogen. The gross product amounted to 710 parts. It formed two layers. The upper organic layer was flash distilled, pressures of 0.1–1 mm. being used with a maximum pot temperature of 150° C., to give 136 parts of distillate and 14 parts of a salt-like residue. The distillate was dried and fractionated. At 88°–93° C./20 mm. there was obtained a cut of 116 parts of diethylaminoethyl vinyl sulfide—a yield of 77.5%. A redistilled sample of this compound boiled at 91.5° C./20 mm. and had a refractive index, $n_D^{20}$, of 1.4853. It gave the correct neutral equivalent, 159.

Example 2

A solution of the salt obtained by refluxing 144 parts of dimethylaminoethyl chloride hydrochloride and 83 parts of thiourea in 250 parts of water was prepared amounting to 477 parts. Of this 12 parts were used for analytical purposes. The remaining 465 parts were mixed with 250 parts of aqueous 50% sodium hydroxide solution. The reactor with this mixture was flushed with acetylene and heated to 120° C. with acetylene being supplied at 480 p.s.i.g. Maximum temperature was 132° C. The reactor was cooled and the products removed under nitrogen. Layers formed and were separated. The upper organic layer was flash distilled, pressures of 0.1 to 1 mm. being used with a maximum pot temperature of 150° C. to give 130 parts of organic material and 15 parts of water. The dry distillate was fractionated. At 67°–71° C./20 mm. 85 parts of dimethylaminoethyl vinyl sulfide were obtained. A portion of the product was redistilled; it boiled at 65.7° C./17 mm. and a refractive index $n_D^{20}$, of 1.4906 and a neutral equivalent of 132 (theory 131).

Example 3

There were mixed in a reactor 24 parts of sodium hydroxide in 40 parts of 2B ethanol and 94 parts of an aqueous solution containing 44 parts of dimethylaminoethyl isothiuronium chloride hydrochloride. The reactor was flushed with nitrogen and then acetylene. It was heated to 98° C. and charged with acetylene at 480 p.s.i.g. The reaction mixture was held at 114°–129° C. for 45 minutes, at which time acetylene absorption had practically ceased. The reactor was cooled and vented. The reaction mixture was allowed to form layers. The aqueous layer was extracted with two 40 part portions of ether and the extract was added to the oil layer. The organic layer was dried over calcium sulfate. Solvents were evaporated and the remaining liquid was evaporated to give 13 parts of 96% pure dimethylaminoethyl vinyl sulfide.

Example 4

A solution of N-methylaminoethyl isothiuronium chloride hydrochloride was prepared by refluxing 130 parts of N-methylaminoethyl chloride hydrochloride and 83 parts of thiourea in 250 parts of water for six hours. This solution was mixed with 240 parts of aqueous 50% sodium hydroxide solution. The reactor was flushed with nitrogen and acetylene and then heated to 94° C. Acetylene at 420 p.s.i.g. was pressed in while the temperature was raised to 137° C. The reactor was then cooled and the reaction mixture was removed. Flash distillation at about 0.5 mm. with a maximum pot temperature of about 100° C. gave 116 parts of distillate. From this 42 parts of water were removed. There was taken at 61° C./21 mm. to 68° C./22 mm. a fraction of 32 parts consisting of N-methylaminoethyl vinyl sulfide. There was isolated and identified 2-imino-3-methyl-1,3-thiazolidine.

The above reaction involving S-(N-methylaminoethyl) isothiuronium halide and acetylene is typical of the series of S-(N-alkylaminoalkyl) isothiuronium halides which may be used to give the novel series of N-alkylaminoalkyl vinyl thioethers, which products were not heretofore available by older methods. These are of interest because they have not only the reactive vinyl group and sulfide linkage but also a reactive hydrogen on the amino nitrogen. These vinyl thioethers give polymers, including copolymers, retaining this reactive hydrogen, which permits modification of the polymers as with mono- or polyisocyanates or with formaldehyde to give methylol compounds for modifying cellulose. The monomers are also useful for their reaction with formaldehyde and use in modifying aminoplasts. These amino-bearing thioethers exhibit fungicidal action, inhibiting the germination of spores of typical test fungi encountered on plants, such as *Stemphylium sarcinaeforme* and *Monilinia fructicola*. Fungicidal action is evident even at 0.001% dilution of such compounds as N-methylaminoethyl vinyl sulfide, N-methylaminopropyl vinyl sulfide, N-ethylaminoethyl vinyl sulfide, or N-butylaminoethyl vinyl sulfide, while N-benzylaminoethyl and N-cyclohexylaminoethyl vinyl sulfides are effective at somewhat higher concentrations. The N-alkylaminoalkyl vinyl sulfides with alkyl groups of not over four carbon atoms each are of primary interest.

Example 5

A solution of 2-bromoethylamine hydrochloride (204 parts) and thiourea (83 parts) in 250 parts of water was heated under reflux for four hours. The solution was cooled and charged to an autoclave. There was added 255 parts of aqueous 50% sodium hydroxide solution. The autoclave was swept out with nitrogen and acetylene and acetylene was pressed in at 460 p.s.i.g., while the autoclave was heated to 100° C. Absorption of acetylene was complete in 19 minutes. The autoclave was then cooled and the reaction mixture blown out with nitrogen. Layers formed and were separated. The organic layer was flash distilled, pressures of 0.2–.6 mm. being used with a maximum pot temperature of 100° C., to give 62 parts of clear distillate and 128 parts of residue. The distillate was saturated with potassium hydroxide to give 20 parts of an oil, which was distilled at 68°–69° C./20 mm. The main fraction amounted to 14 parts. It was identified as 2-aminoethyl vinyl sulfide. The product had a neutral equivalent of 105 (theory 103).

Example 6

A solution was prepared from 130 parts of 3-aminopropyl chloride hydrochloride, 76 parts of thiourea, and 200 parts of ethanol. The solution was heated under reflux for four hours. The resulting solution was diluted with 58 parts of water and placed in a pressure reactor together with 240 parts of aqueous 50% sodium hydroxide solution. The reactor was swept out with nitrogen and pressured with acetylene at 480 p.s.i.g. while the charge was heated up to 130° C. The reactor was cooled. The reaction products were partly liquid and partly solid. They were filtered. The filtrate was treated with 50 parts of anhydrous potassium carbonate to remove water. Liquid was decanted off and flash distilled at 0.1–0.5 mm. with a maximum pot temperature of 150° C., to give 98 parts of distillate. This was saturated with potassium hydroxide. An oil phase of 48 parts separated. It was dried with additional potassium hydroxide and distilled into small fractions starting at 33° C./40 mm. with intermediate fractions at 80° C./20 mm. to 85.5° C./20 mm. and pure fractions at 85.5° C./20 mm. to 51° C./2.8 mm. After a forerun of about 10 parts fractions were obtained which by analysis were chiefly 3-aminopropyl vinyl sulfide. The main fractions totaled 33 parts. A redistilled sample came over at 68° C./7 mm. to 51° C./2.8 mm. It had a refractive index, $n_D^{25}$, of 1.5158.

Example 7

A solution was prepared from 158 parts of dimethylaminoisopropyl chloride hydrochloride, 83 parts of thiourea, and 160 parts of n-propanol. It was heated under reflux for nine hours to give a brown solution of the isothiuronium salt. Propanol was distilled from this solution and the residue was taken up in 187 parts of water and placed in an autoclave, to which 240 parts of aqueous sodium hydroxide solution was added. The autoclave was flushed as usual, heated to 93° C., and pressured with acetylene at 500 p.s.i.g. The maximum temperature reached was 132° C. When absorption of acetylene was over, the autoclave was cooled and the reaction mixture removed and allowed to form layers. The upper organic layer (183 parts) was taken and flash distilled at 0.1–.5 mm. with a maximum pot temperature of 150° C. into a receiver cooled with Dry Ice and acetone. The distillate of 157 parts was fractionally distilled. The main fraction of 52 parts was taken at 77.5°–78.5° C./17 mm. and was pure dimethylaminoisopropyl vinyl sulfide. The refractive index was 1.4904 at 25° C.

Example 8

A solution was prepared from 139 parts of 1-bromobutane, 80.5 parts of thiourea, and 88 parts of dry ethanol and heated under reflux for six hours. There was formed the desired butyl isothiuronium salt, as shown by ionizable bromide. A main portion of this solution containing 0.97 mole of butyl isothiuronium bromide was charged to an autoclave, to which 100 parts of water and 160 parts of aqueous 50% sodium hydroxide solution were added. The autoclave was flushed as usual, heated to about 95° C., and pressured with acetylene up to 465 p.s.i.g. The temperature rose to 112° C. The autoclave was cooled and the reaction mixture removed. The oil layer which formed was taken and flash distilled at 0.1–1 mm. with a maximum pot temperature of 150°

C. to give 117 parts of distillate. This was fractionally distilled. The main fraction of 101 parts was identified as 98% pure butyl vinyl sulfide. It distilled at 69°–70° C./60 mm. and had a refractive index of 1.4723. Some additional butyl vinyl sulfide was present in the fore and after runs.

*Example 9*

A solution was made from 132 parts of 2-bromobutane, 77 parts of thiourea, and 84 parts of dry ethanol. It was heated under reflux for eight hours to give a pale solution of sec-butyl isothiuronium bromide. This was placed in an autoclave and treated with 160 parts of aqueous 50% sodium hydroxide solution and treated as in Example 8. The oil layer from the reaction mixture was flash distilled at 0.1–1 mm. with a maximum pot temperature of 150° C. to give 112 parts of distillate and 5 parts of oily residue. Upon redistillation a main fraction of 86 parts was taken at 73°–75° C./115 mm. It was essentially pure sec-butyl vinyl sulfide. Its refractive index was 1.4687 at 25° C.

*Example 10*

A solution of 100 parts of 1-bromotetradecane, 29 parts of thiourea, and 88 parts of dry ethanol was prepared and heated under reflux for four hours. The desired isothiuronium salt crystallized out when the reaction mixture was cooled. It was filtered off and dried at 50° C./20 mm. to give 97 parts of tetradecyl isothiuronium bromide.

This was dissolved in 260 parts of 2B ethanol and 75 parts of water. This solution with 43 parts of aqueous 50% sodium hydroxide was placed in an autoclave and treated as in previous examples. Reaction temperatures were 93°–126° C. and acetylene pressures were 425–490 p.s.i.g. Reaction time was 45 minutes. The reaction mixture consisted of two liquid layers and suspended salt. The oil layer was taken and distilled. A main fraction of 63 parts was obtained at 105°–106° C./0.5 mm. It was found to be chiefly tetradecyl vinyl sulfide. Upon dilution of the lower layer with water another 10 parts of the oil separated.

In the same way any other alkyl thiuronium halide is converted to the corresponding alkyl vinyl sulfide.

*Example 11*

A solution was prepared from 163 parts of cyclohexyl bromide, 76 parts of thiourea, and 250 parts of n-butanol. It was heated under reflux for 30 hours. It was noted late in this period that water was present in the refluxing condensate. Butanol was distilled from the refluxed mixture and the residue was treated with 350 parts of water.

The resulting mixture was charged to an autoclave and 260 parts of aqueous sodium hydroxide solution containing 80 parts of the hydroxide were added. The charge was treated as in previous examples with the temperature rising to 127° C. and acetylene being supplied up to 450 p.s.i.g. Absorption time was less than 30 minutes. The reaction mixture was separated as usual. The oil layer amounting to 152 parts was flash distilled at 0.1–.5 mm. with a maximum pot temperature of 150° C. and the distillate was fractionally redistilled. A fraction of 18 parts of butyl vinyl sulfide was taken at 55° C./31 mm. This resulted from butyl bromide being formed from the solvent with conversion to the butyl isothiuronium salt. At 69°–71° C./9 mm. a main fraction of cyclohexyl vinyl sulfide was obtained in an amount of 43 parts. The refractive index, $n_D^{25}$, of a heart portion of the distillate was 1.5094; its density, $$d_{25}^{25}$$

was 0.9464.

In the same way other halides having a cyclohexyl nucleus can be used, including alkyl substituted, phenyl substituted, or amino substituted cyclohexyl chlorides or bromides.

*Example 12*

A solution of 127 parts of benzyl chloride, 80 parts of thiourea, and 90 parts of dry ethanol was heated under reflux for three hours to form benzyl isothiuronium chloride, which crystallized out when the solution was cooled. Ether was added to complete crystallization. The salt was filtered off and dried at 50° C./20 mm. for five hours. The yield was 185 parts of this salt. A small portion was used for ultimate analysis.

The rest of it (183 parts) was dissolved in 250 parts of water, charged to an autoclave, and treated with 160 parts of aqueous 50% sodium hydroxide solution. The charge was treated as in previous examples, temperatures of 98°–108° C. being used and acetylene being supplied up to 470 p.s.i.g. Absorption was complete in nine minutes. The reaction mixture was separated as above and flash distilled at about 0.5 mm. with a maximum pot temperature of about 150° C. to give 123 parts of an oil and 8 parts of water. This oil was fractionally distilled. At 95°–96.5° C./10 mm. 120 parts of benzyl vinyl sulfide was obtained. It contained by analysis 21.4% of sulfur (theory 21.3%) and had a refractive index of 1.5769 at 25° C.

In like manner the reaction was carried out using but 1.1 mole of sodium hydroxide per mole of benzyl isothiuronium chloride. The yield of benzyl vinyl sulfide was 131 parts of 87.3%. Repetition of the process with 1.05 moles of sodium hydroxide gave a yield of 83.9% (129 parts), while with only 0.5 mole of sodium hydroxide the yield fell off to 59 parts or 39%.

*Example 13*

To a solution of 28.4 parts of thiourea in 60 parts of ethanol 47.5 parts of 2-chloromethyl thiophene were slowly added while the mixture was heated at reflux. The reaction was highly exothermic. After addition of the chloromethyl thiophene was complete, refluxing was continued for an hour. The solution was then cooled and allowed to stand. Crystals formed. They were collected and dried for four hours at 50° C./1 mm. to give 46.5 parts of pure thenyl isothiuronium chloride.

A solution of 41.7 parts of this chloride in water and 32 parts of aqueous 50% sodium hydroxide solution were placed in a pressure reactor, which was then flushed with inert gas and with acetylene and heated to 97° C. Acetylene was supplied up to 480 p.s.i.g. and the temperature was carried to 120° C. The cooled reaction mixture was twice treated with ether and the ether extracts were taken off, combined, and distilled. At 78° C./3 mm. 17 parts of thenyl vinyl sulfide were obtained. A sample from the mid-point of the distillation had a refractive index, $n_D^{25}$, of 1.59718.

*Example 14*

A solution of 87 parts of thiourea in 90 parts of dry ethanol was heated under reflux and thereto a solution of 229 parts of phenoxyethyl bromide in absolute ethanol was added. Heating with reflux was continued for three hours. When this solution was cooled, crystals formed. These were not separated but were redissolved by addition of water (140 parts). The solution contained phenoxyethyl isothiuronium bromide.

It was charged to an autoclave and 90 parts of water and 240 parts of aqueous 50% sodium hydroxide solution were added. The autoclave was flushed with nitrogen and acetylene and heated to 80° C. Acetylene was pressed in up to 480 p.s.i.g. with the temperature raised to 135° C. The autoclave was cooled and the reaction mixture taken as a mushy solid. This was slurried with ether. The solid was dissolved in hot ethanol and the solution was saturated with carbon dioxide. A lightly colored slush resulted. This was dissolved in 100 parts of water and extracted with ether. From this was obtained 27 parts of phenol. From the ether filtrate there was obtained 99 parts of a water-insoluble residue, which was flash distilled at 0.25 mm. pressure to a maximum pot temperature of 135° C. to give 50 parts of distillate. This was fractionated. At 87°–89° C./0.6 mm. there was obtained quite pure phenoxyethyl vinyl sulfide. It had a refractive index, $n_D^{25}$, of 1.5633 and a density $$d_{25}^{25}$$

of 1.0791. The yield was 25 parts.

This example illustrates how aryloxyalkyl halides can be used to give isothiuronium compounds which react with acetylene to give vinyl thioethers. The aryloxylalkyl group can be successfully replaced with alkoxyalkyl, cyclohexyloxyalkyl, benzoxyalkyl, alkoxyalkoxyalkyl, and like groups to give corresponding vinyl thioethers. Likewise, alkylthioalkyl, or arylthioalkyl halides can be used to give compound having several thioether linkages.

*Example 15*

There were mixed 120 parts of tetrahydrofurfuryl chloride and 76 parts of thiourea in 200 parts of benzene-denaturated ethanol. This mixture was heated under reflux for about 72 hours. Ethanol was distilled from the reaction mixture and 250 parts of water added thereto. This mixture was placed in an autoclave and treated with a solution of 80 parts of sodium hydroxide in 180 parts of water. The autoclave was swept out with nitrogen and then with acetylene. It was heated to 110° C. while acetylene was passed in under pressures from 275 to 445 p.s.i.g. The temperature was held at 110° to 137° C. for an hour. The autoclave was cooled and the pressure relieved. The reaction mixture consisted of two phases. The organic layer was taken and flash distilled at pressures of less than 0.5 mm. to a maximum pot temperature of 150° C. A clear distillate of 159 parts was thus obtained and a brown, viscous semi-solid residue of 73 parts. The flash distillate was now fractionated. At 84° C./10.5 mm. a main fraction of 35 parts was obtained. The refractive index was 1.5097 at 25° C. It was tetrahydrofurfuryl vinyl sulfide.

*Example 16*

There were mixed 318 parts of thiourea, 224 parts of water, and 300 parts of 1,4-dibromobutane. This mixture was heated under reflux for eight hours, by which time all of the 1,4-dibromobutane had disappeared. The resulting solution was extended with 650 parts of water and charged to an autoclave. There was also charged 430 parts of an aqueous 50% sodium hydroxide solution. The autoclave was flushed with nitrogen and then acetylene. The reactants were stirred and heated while acetylene was passed in at 295–400 p.s.i.g. with the temperature held at 106°–110° C. for 11 minutes. The autoclave was cooled and vented. There were two layers in the reaction mixture which were separated. The upper layer of 221 parts was flash distilled at 0.1–0.5 mm. to a maximum pot temperature of 150° C. to give 184 parts of clear distillate and leave a semi-solid black residue of 37 parts. This distillate was fractionally distilled through a packed column. At 83° C./0.7 mm. a main fraction of 165 parts was collected. It had the correct analysis for 1,4-bis(vinylmercapto)butane, $$CH_2=CHSCH_2CH_2CH_2CH_2SCH=CH_2$$

At 20° C. it has a refractive index of 1.5471 and density, $$d_{20}^{20}$$

of 1.0154, while at 25° C. the refractive index, $n_D^{25}$, is 1.5443 and the density, $$d_{25}^{25}$$

is 1.0116.

*Example 17*

There were mixed 130 parts of N-methylaminoethyl chloride hydrochloride, 102.2 parts of ethylene thiourea, and 200 parts of ethanol. This mixture was heated under reflux for 4.5 hours. Ethanol was distilled off and the residue was taken up in 250 parts of water. The resulting solution was filtered and together with 168 parts of aqueous 50% sodium hydroxide solution was placed in an autoclave. The system was flushed with acetylene. The charge was heated rapidly to 108° C. Acetylene was pressed in at 400–500 p.s.i.g. while the reaction mixture was held at 108°–147° C. for two hours. A total of 85 parts of acetylene were absorbed.

The reaction mixture was separated, as in previous examples, into an aqueous phase and an organic layer. The wet organic layer was flash distilled at 0.1–.5 mm. with a maximum temperature in the pot of about 150° C. into a receiver cooled with carbon dioxide ice and acetone. There was thus obtained a clear distillate of 148 parts. This was dried over potassium carbonate and the dried distillate was fractionally distilled. At 71° C./23.5 mm. a fraction of 22 parts was obtained. It corresponded by analysis to N-methylaminoethyl vinyl sulfide. It has a neutral equivalent of 117 (theory 117) and contained by analysis 51.23% of carbon, 9.46% of hydrogen, 27.35% of sulfur, and 11.95% of nitrogen. Corresponding theoretical values are 51.75%, 9.28%, 26.94%, and 11.86% respectively. The refractive index, $n_D^{20}$, is 1.5046 and, $n_D^{25}$, 1.5022. The density at 20°/20° C. is 0.9544 and at 25°/25° C. is 0.9514.

This compound is an interesting new one which has a basic nitrogen group with one reactive hydrogen, at which point it reacts with ethylene oxide whether as monomer or polymer. It adds formaldehyde to give a methylol compound which is a useful finishing agent for textile fibers and paper. It reacts with cyanogen chloride to give the cyanamide. It polymerizes to give homopolymers and copolymers with other polymerizable vinylidene compounds, supplying a basic and reactive group, which is useful in treating paper, textile, or leather.

In place of ethylenethiourea used here there can be used in comparable fashion other substituted thioureas which can form isothiuronium salts with organic halides. Any of these isothiuronium salts can be reacted as described with acetylene. In place of N-methylaminoethyl chloride hydrochloride used in Example 17 there may be used the corresponding bromide hydrobromide or any other organic halide as shown above, RX, where R has any of the meanings stated above.

Vinyl thioethers which are preparable by the process of this invention include previously known vinyl thioethers and also many thioethers not heretofore available from the processes of the art. Vinyl thioethers broadly are useful for providing polymers, both homopolymers and copolymers formed with other unsaturated polymerizable materials. The polymers find use in textile finishing, leather, paper, and the coatings art. They can be formulated to give additives for fuel oils and lubricating oils. The monomers can be used also as chemical intermediates, reacting at the vinyl linkage with mercaptans, for example, or at the sulfide linkage. Thus, the vinyl thioethers are oxidized with aqueous hydrogen peroxide to give sulfoxides and then sulfones which are valuable modifiers for cellulose. The vinyl thioethers serve as dienophiles, reacting, for instance, with cyclopentadiene, or with other conjugated unsaturated compounds. The monomers are also useful as softeners of plastics, particularly when they have groups of four or more carbon atoms, and as regulators or promotors in the polymerization of vinylidene compounds with peroxidic catalysts, serving, for example, to control chain length when used in low concentrations.

I claim:

1. A process for preparing vinyl thioethers which comprises reacting by bringing together in an aqueous system an isothiuronium salt having an S-substituent from the class consisting of alkyl, cycloalkyl, and benzyl, alkoxyalkyl, cyclohexoxyalkyl, phenoxyalkyl, and benzoxyalkyl, the oxyalkyl groups thereof having two to three carbon atoms, aminoalkyl, N-alkylaminoalkyl, and N,N-dialkylaminoalkyl, the alkyl groups thereof having not over four carbon atoms each and thenyl, and tetrahydrofurfuryl groups and acetylene and heating the mixture thereof between 90° and 200° C. in the presence of at least about one mole of alkali metal hydroxide per isothiuronium group.

2. A process for preparing vinyl thioethers which comprises reacting by bringing together in an aqueous system an isothiuronium halide having an S-substituent from the class consisting of alkyl, cycloalkyl, and benzyl, alkoxyalkyl, cyclohexoxyalkyl, phenoxyalkyl, and benzoxyalkyl, the oxyalkyl groups thereof having two to three carbon atoms, aminoalkyl, N-alkylaminoalkyl, N,N-dialkylaminoalkyl, the alkyl groups thereof having not over four carbon atoms, each, thenyl, and tetrahydrofurfuryl groups and acetylene and heating the mixture therof between 90° and 200° C. under pressure in the presence of at least about one mole of alkali metal hydroxide per isothiuronium group.

3. A process for preparing vinyl thioethers of the formula $RSCH=CH_2$ which comprises bringing together in an aqueous system an isothiuronium halide $$R-SC(NH_2)=NH.HX$$

where X is a member of the class consisting of chlorine and bromine and R is a member of the class consisting of alkyl, cycloalkyl, and benzyl, alkoxyalkyl, cyclohexoxyalkyl, phenoxyalkyl, and benzoxyalkyl, the oxyalkyl groups thereof having two to three carbon atoms, aminoalkyl, N-alkylaminoalkyl, and N,N-dialkylaminoalkyl, thenyl, and tetrahydrofurfuryl groups, and acetylene and heating the mixture thereof between 90° and 200° C. under pressure in the presence of at least about one mole of alkali metal hydroxide per equivalent of isothiuronium halide.

4. A process according to claim 3 in which the alkali metal hydroxide is sodium hydroxide.

5. A process for preparing aminoalkyl vinyl thioethers which comprises bringing together in an aqueous system an isothiuronium halide having an S-aminoethyl substituent and acetylene and heating the mixture between 90° and 200° C. under pressure in the presence of at least about one mole of alkali metal hydroxide per mole of S-aminoethyl isothiuronium halide.

6. A process according to claim 5, wherein the S-aminoalkyl isothiuronium halide is S-(N-methylaminoethyl) isothiuronium chloride.

7. A process according to claim 5, wherein the S-aminoalkyl isothiuronium halide is S-(2-dimethylaminoethyl) isothiuronium chloride.

8. A process according to claim 5, wherein the S-aminoalkyl isothiuronium halide is S-(2-diethylaminoethyl) isothiuronium chloride.

9. A process for preparing thenyl vinyl thioether which comprises bringing together in an aqueous system S-thenyl isothiuronium chloride and acetylene and heating the resulting mixture between 90° and 200° C. under pressure in the presence of an alkali metal hydroxide as catalyst.

10. A process for preparing tetrahydrofurfuryl vinyl thioether which comprises bringing together in an aqueous system S-tetrahydrofurfuryl isothiuronium chloride and acetylene and heating the resulting mixture between 90° and 200° C. under pressure in the presence of an alkali metal hydroxide as catalyst.

References Cited in the file of this patent

FOREIGN PATENTS 617,543   Germany _____ Aug. 1,1935

OTHER REFERENCES

Albertson et al.: Jour. Amer. Chem. Soc., vol. 67, (1945) pp. 1222–1223.

Brewster: Organic Chemistry (1948), p. 300.

Lawson et al.: Journal American Chemical Society, vol. 47, p. 2825 (1925).